Aug. 23, 1960 H. S. LEMAN 2,950,351

TELEPHONE SUBSCRIBERS' INSTRUMENTS

Filed Dec. 19, 1956

Inventor
H. S. LEMAN
By Robert Harding Jr.
Attorney 2,950,351

TELEPHONE SUBSCRIBERS' INSTRUMENTS

Hugh Spence Leman, London, England, assignor to International Standard Electric Corporation, New York, N.Y., a corporation of Delaware Filed Dec. 19, 1956, Ser. No. 629,390
Claims priority, application Great Britain Jan. 4, 1956
1 Claim. (Cl. 179—81)

This invention relates to telephone subscribers' instruments, or "subsets," and comprises an improvement in, or modification of, the prior copending application of L. C. Pocock, filed February 2, 1955, and bearing Serial No. 485,707, now U.S. Patent 2,838,612, issued June 10, 1958.

In this prior application, there is described a subset containing a crystal amplifier (transistor) in the circuit between the transmitter and the line, and the amplification thereby provided was employed to enable the usual induction coil to be dispensed with. The induction coil and the transistor are both relatively expensive items, and the replacement of the one, a standard item, by the other, a new tool with unexplored possibilities, constituted a considerable advance in a field where further advances are likely to be toward "all-electronic" exchange working.

The transistor used as a basis for the subset of the said prior application had a current gain of 20, and comparatively little variation in behaviour with temperature, and experience has shown that with such a current gain, adequate perormance for the subset as described can be secured.

Now that transistors with considerably higher current gains are available, it becomes possible to use such transistors with added resistors to improve gain and temperature stability, and to replace certain remaining expensive items, thus still further cheapening the subset as formerly described.

According to the invention, therefore, there is provided telephone subscriber's instrument in which the transmitter (or transmitter amplifier) feed inductor and transistor base capacitor are replaced by resistors of suitable value.

Subsidiary modifications are directed to the provision of a rectifier switch for ensuring correct polarity of potential supplies at the transistor and the application of negative feedback in the transistor amplifier.

The improvements forming the subject of the present invention will be described with reference to the accompanying drawing, wherein—

Figure 1:
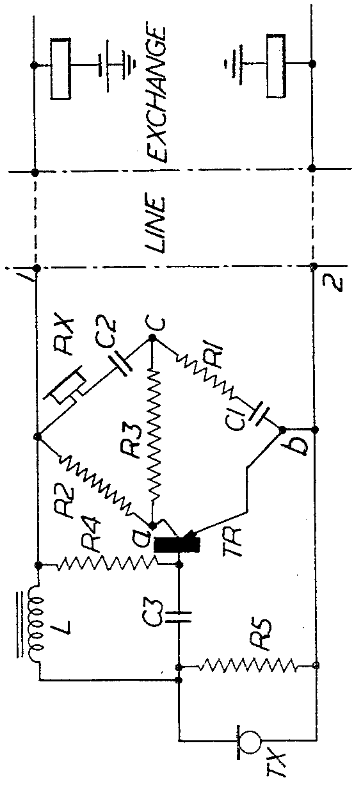
Figure 2:
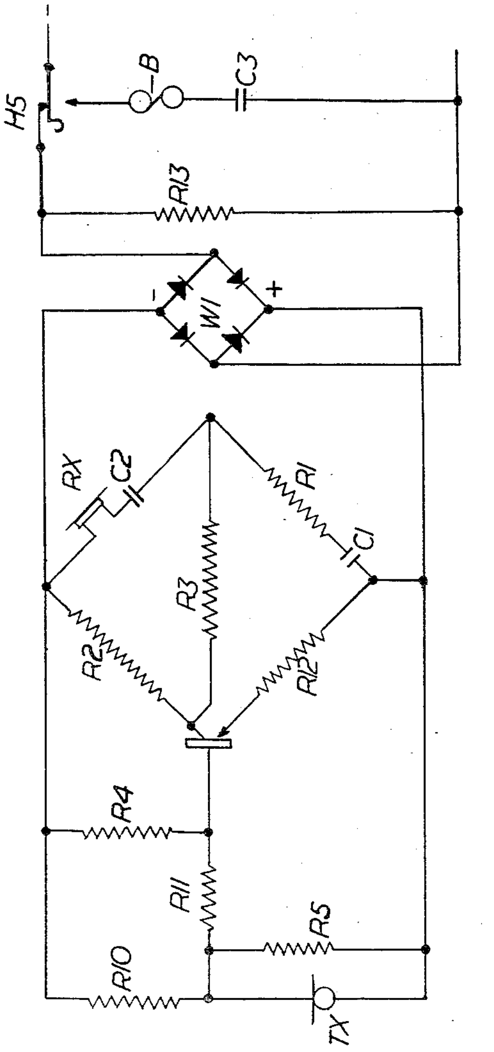

Fig. 1 is a schematic diagram of a subset utilizing a transistor amplifier as disclosed in said copending application and constitutes the basic subset circuit (less dial springs, gravity switch, etc.); and Fig. 2 shows the basic circuit modified by the improvements now proposed.

Although the basic transistor subset circuit has been fully described in the said prior application, it is desirable to reproduce this description in order to get the present proposals into perspective.

In Fig. 1, the circuit of a subset is shown connected over a line to a central battery exchange providing a line voltage of 48 volts through the usual line relays, as shown, or through a transmission bridge. The circuit to the left of the chain dotted lines is the subset circuit.

A carbon granules transmitter TX receives energising current from the line through an inductance L, which may be the windings of the usual bell (not shown) or part of them, to save a separate coil. The transmitter is also connected via a series capacitor C3 across the base-emitter circuit of a transistor TR which may be of the type described in British patent Specification No. 694,021. The D.C. supply for the collector-emitter circuit of the transistor TR is obtained from the central exchange battery via the line and resistor R2. The base of TR is biased through a resistor R4 connected to the line terminal 1 of the subset, the emitter being connected to line terminal 2.

The transmitter TX is shunted by a resistor R5 which is provided so that if the transmitter is removed or becomes exceptionally high in resistance, there is a fixed resistance path for the current and the transistor is protected from excessive voltage.

The amplified transmitter signals from the emitter-collector circuit of TR are fed across the diagonal points of an anti-side tone bridge circuit comprising R1—C1, receiver RX—C2, R2, R3 and line, the portion of the amplified transmitter signal which reaches the line taking the course: Terminal 2, TR emitter, TR collector, R2, terminal 1. Whilst the presentation of the circuit according to Fig. 1 shows the D.C. feed and bias arrangements more clearly, the bridge circuit and the conjugate relationship of the transistor (plus transmitter) and the receiver, and of the line and the so-called $x$-network (R1—C1) appear more clearly in the re-arrangement given in Fig. 2 of the said prior application. As this forms no part of the present invention, it is not reproduced herein, or further reference made to it.

In Fig. 2, advantage is taken of the use of transistors with greatly increased current gains, and possibly also the use of more efficient transmitters (though these are not essential) to eliminate some of the remaining expensive items and improve all-round stability.

In the formerly described subset, the transistor amplifier had a current gain of about 20, and the inductor left in the circuit and feeding the transmitter and shunt (R5) had between them sufficiently low ohmic resistance to provide an adequate line-holding function. Moreover, it was considered desirable to have a well-defined base bias current.

However, it has been found possible to replace the base capacitor C3 by a resistor R11, and the transmitter feed-inductor by a resistor R10, and since R10 is of the order, possibly, of some 2000 ohms, the line-holding function is taken over by a further additional resistor R13, of 800–1000 ohms, connected directly across the line terminals.

Such changes reduce considerably the cost of the extra components proper to the transistor circuit.

Base resistor R11 is not readily specified in the absence of precise information regarding the transistor, but may be of the order of a few thousand ohms. In the modified circuit, therefore, the original base-feed resistor of some 30,000 ohms may well become redundant.

The use of transistors with improved current gains (beyond the originally mentioned "suitable" value of about 20) permits the use of an additional resistor in the emitter circuit to reduce the effective current gain to the order of 20. This is in the nature of a negative feedback, with the usual consequences of negative feedback in increase of stability; a reduction in the effects of temperature variation, and the allowance of wider tolerances between the characteristics of individual transistors. Such an arrangement is shown in Fig. 2, where R12 replaces the former direct connection of the emitter to the positive line.

If necessary also, the base bias resistor could be connected to the collector terminal for temperature compensation.

Inserted between the line terminals 1, 2 and the transistor amplifier is a rectifier switch W1, consisting quite simply of a bridge-connected set of rectifiers, facing the line at its A.C. terminals, the object of which is to ensure that the transistor receives the correct potentials on its electrodes regardless of the polarity at the set terminals 1 and 2, which may be uncertain in specific cases on account of battery reversals at the exchange for metering or other purposes. The usual hook switch contacts HS may be provided which normally connect the line to the bell B and the series condenser 3 as shown in Fig. 2.

Although no mention has been made hitherto in this description of the line equalising network R6—R7—V1—V2 of the said prior specification, the present proposals are intended to apply equally to subsets containing such networks.

Also, the sound-powered subset of Fig. 6 of the prior specification is equally susceptible to the improvements now proposed, the replacement of L and C3 by resistors having the effect incidentally of causing the values of R6 and R7 in that figure to be modified.

While the principles of the invention have been described above in connection with specific embodiments, and particular modifications thereof, it is to be clearly understood that this description is made only by way of example and not as a limitation on the scope of the invention.

What I claim is:

A telephone subscriber's station connected to a two-wire telephone line, a transistor amplifier having an emitter electrode, a collector electrode and a base electrode, a bridge network connected across said line, the said emitter and collector electrodes included in first and second arms of said bridge network in an amplifying path across the line, a telephone receiver included in third and fourth arms of said bridge network in a receiving path across said line, and a telephone transmitter having one side connected to one of said wires and the other side connected to the other wire in a first branch including a first resistance element and connected to the said bridge network in a second branch including a second resistive element and said base electrode in series.

References Cited in the file of this patent

UNITED STATES PATENTS

| | | |
|---|---|---|
| 2,831,067 | Bryant | Apr. 15, 1958 |
| 2,838,612 | Pocock | June 10, 1958 |
| 2,858,371 | Jones | Oct. 28, 1958 |